Jan. 29, 1929.
F. W. G. BRUHN
1,700,399
RECORDING APPARATUS
Filed Feb. 5, 1926    2 Sheets-Sheet 1
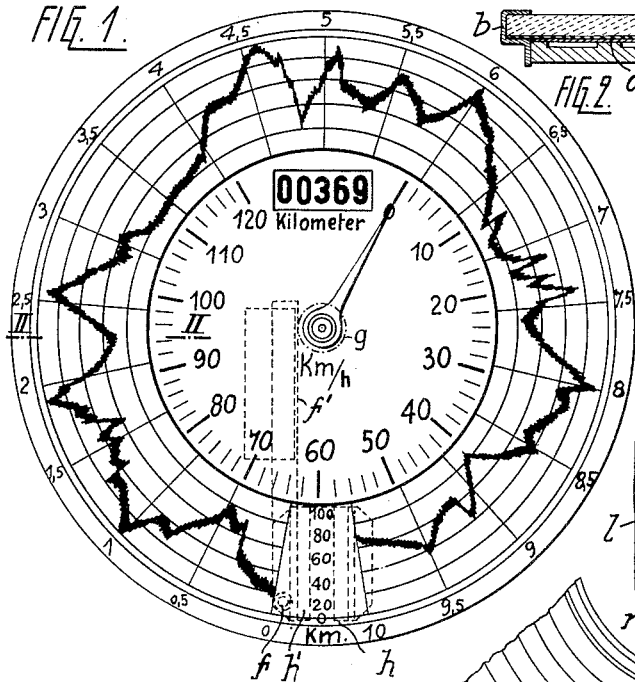
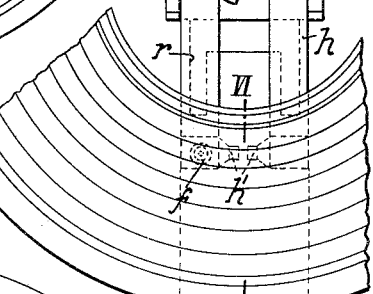
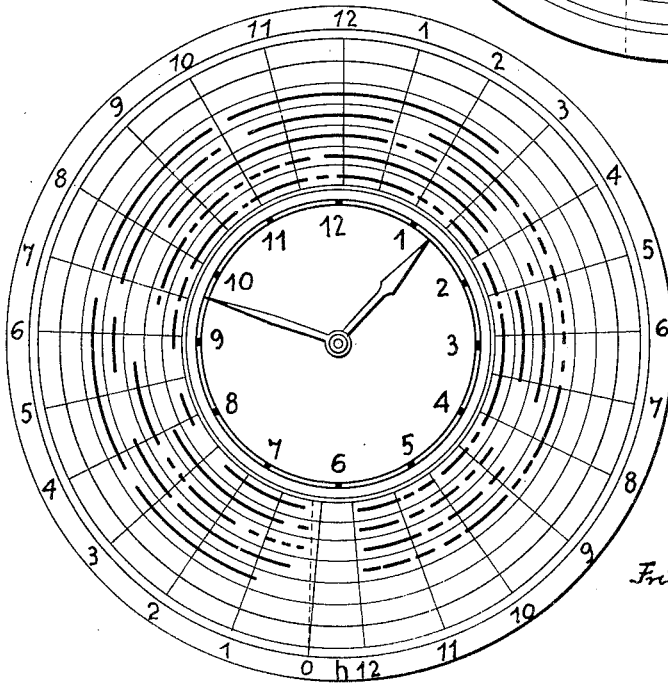
Inventor:
Friedrich Wilhelm Gustav Bruhn
by Herbert G. R.
Atty.

Jan. 29, 1929.
F. W. G. BRUHN
1,700,399
RECORDING APPARATUS
Filed Feb. 5, 1926  2 Sheets-Sheet 2
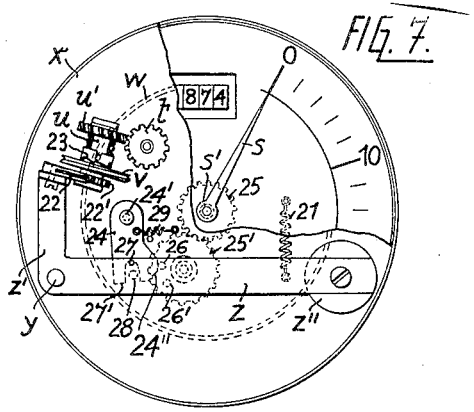
Inventor:
Friedrich Wilhelm Gustav Bruhn
by Herbert G. R.
Atty.

Patented Jan. 29, 1929.

1,700,399

UNITED STATES PATENT OFFICE.

FRIEDRICH WILHELM GUSTAV BRUHN, OF BERLIN-WILMERSDORF, GERMANY.

RECORDING APPARATUS.

Application filed February 5, 1926, Serial No. 86,235, and in Germany October 23, 1925.

My invention relates to an apparatus for recording the length or the time of motion or way covered by a moving object, as for instance a motor-car or the like. The constructional forms of the apparatus illustrated by way of example and described on the following pages are intended especially for motor cars, but I wish it to be understood that the apparatus can be used also in connection with other machines where the length or the time of travel or way of a moved or moving part or member to be recorded.

With regard to motor cars it is important that the indicating apparatus does not only permit direct reading of the speed of the car at any time, or the distance the car has traveled, or the number of hours it has been under the way, but also of the reexamination at some later time of the speed or time of run or whether and at which time the car has been running or not. All this might be rendered possible by combining the indicating device with a recording device, but a combination of this kind entails the necessity of exchanging the recording sheet or dial either daily or at least once a week, and it is also necessary to open and close the apparatus for this purpose.

The present invention has as its basis a combination of an indicating device and a recording device in which the frequent exchange of the registering sheet or dial is dispensed with. The object of this combination is to provide an automatic writing member or implement which operates on a permanent sheet or dial from which the record registered upon it can be effaced. It is a further object to provide a permanent sheet or dial designed for registering or recording purposes with a scale showing the hours of a day or the days of a week or both and to permit the reading and reexamination of runs, their periods of time and their speeds from the commencement to the end of a week. The effacing of the record is effected preferably automatically by means of a suitably arranged member which may be operated at the proper time by the driving mechanism of the control device by which also the permanent sheet or dial may be actuated so that the proper movement of the effacing member relatively to said sheet or dial, or of this latter to said member, is obtained.

Writing the record may commence on either side of the sheet or dial. If provision shall be made that the sheet or dial shall not be accessible so as to prevent it from being written upon from the outside of the apparatus, it is then covered with a rigid and transparent disk, and the writing action is effected in this case preferably on the back face of the sheet or dial by the writing member that is operated by the driving mechanism.

If with an apparatus of this type the transmission gear should fail, the sheet or dial with the record thereon will come to rest, and it will be impossible to ascertain the hours, or the length of time, when the car had stopped. It is, consequently, also impossible to ascertain the actions of the car-driver for the time thereafter as the speed-indicator does not permit ascertaining the speed of the car during this latter period. Should an accident occur, the car-driver can refer to the registration made in the preceding time. It is, in view of this possibility, important to efface continually the registrations, as is effected automatically in the present improved apparatus by the driving mechanism immediately in front of the writing member with respect to the plane of the sheet or dial.

Now in order to obtain this effect I have provided a separate driving mechanism which operates independently of the main driving gear, and may be constituted, for instance, by a jolting mechanism operating automatically by the jerking movement of the car while running. The registering sheet or dial is moved by this mechanism if the main driving gear should fail from any reason, but as long as this gear is in proper operative position, the other driving mechanism is out of operation. When, however, the main gear becomes inoperative, the jolting mechanism is released automatically and effaces gradually that portion of the record which is no longer required, so that it is possible to ascertain at any time, for instance by official inspectors, whether or not the apparatus is in proper operative state.

The invention is illustrated diagrammatically and by way of example in the accompanying drawing, in which Figure 1 is a front view of an indicating apparatus designed according to this invention, this apparatus constituting a speed indicating device provided with an annular recording disk surrounding a kilometer dial, said annular disk showing a 24 hours speed record; Figure 2 is a cross-section in the plane II—II of Fig. 1; Figure 3 is a part-view of the writing pin, and a defacing magnet, the wall of the casing being omitted; Figures 3ª, 3ᵇ and 3ᶜ, are partial longitudinal sections through three modifications of defacing means; Figure 4 is a front view of a modified constructional form of an apparatus showing the periods of running and of stopping of the car in a week; Figure 5 shows a magnetic defacing device for use in connection with said modification; Figure 6 is partly a side-view of, and partly a section through, the recording sheet and the means for guiding it, the section lying in the plane VI—VI of Fig. 5; and Figure 7 shows partly the second or auxiliary driving mechanism (also mentioned in the preamble) for the recording dial, viz. the jolting mechanism, and partly the dial pertaining to this apparatus.

The casing of the speed indicator and recording apparatus shown in Figs. 1–3 or, in other words, the dial and recording disk thereof, is covered with a sufficiently thick plate $a$ of glass or another suitable material. If, instead of glass, an unbreakable substance, such as celluloid, artificial horn or the like, is used, the respective plate should be thick enough to prevent writing upon the recording disk $c$ from the outside; this disk is located immediately behind the covering plate $a$ and both parts $a$ and $c$ are held together by a profiled ring $b$.

Behind the recording disk $c$ a foil $d$ of paper, iron, or another material, is provided; this foil is of a dark color and provided with a sticky substance which adheres at once to the recording disk $c$ when being brought in contact therewith. The other face of the foil is covered with a backing $e$ which is also enclosed by and in the ring $b$ and by means of which the parts $c$ and $d$ can be attached to the indicating device.

At a suitable location the backing $e$ is provided with a recess which, in the constructional form shown in Fig. 1, is located at the lowermost portion of the backing, and a writing pin $f$ affixed to a rack $f'$ meshing with a centrally disposed pinion $g$ extends radially inwards through said recess. The pinion $g$ is turned by the speed recording device and may be secured to the shaft of the hand. The said recess is so large that the pole-shoes $h'$ of a defacing magnet $h$ can also extend therethrough. There might be, if desired, two recesses, a smaller one for the writing pin, and one for the pole shows, and this latter recess might be located at some other place in the ring $b$, but I prefer to arrange the pole-shoes just in front of the writing pin, with respect to the plane of the members $a$, $c$, $d$, so that the recording ring $c$ shows the complete record of 24 hours, the record being effaced gradually immediately in front of the writing pin.

The record is effaced by lifting the foil $d$ from the transparent sheet $c$. This can be done in several ways. In Fig. 3 the foil which is supposed in this case to consist of iron is attracted by the pole shoes $h'$ of the magnet $h$ which extend towards the foil through the recess already mentioned. In the modification shown in Fig. 3ª where the foil is assumed to consist of a non-magnetic material, and where, therefore, no magnet is provided for the effacing, this is effected by an arm $h''$ extending between the foil and the sheet near the writing pin. In the next modification, Fig. 3ᵇ, the effacing is effected by mechanical wiping, in connection with a chemical means. There may be provided, for instance, a writing pin $f$ of a kind producing an oxidizing line upon the sheet, and an effacing cushion $h^+$ composed of a chemically treated substance or composition having a reducing effect upon said line so as to make it disappear. Another means for effecting the effacing can consist in making the foil $d$ just a little longer than the sheet $c$ so as to cause a certain small portion thereof to form a curve $d'$ (Fig. 3ᶜ) in a recess $e^+$ of the backing $e$. The foil portion forming the curve $d'$ changes continually in conformity with the rotatory motion of the foil, in consequence whereof the record written upon the sheet $c$ is continually effaced just in front of the writing pin, as desired.

It is immaterial whether the writing sheet or dial is moved by the driving gear of the controlling device or whether this gear is employed for operating the writing pin. But an essential feature is that the writing pin, as well as the effacing means, is actuated automatically by the driving means provided for the indicating device.

If the record is to be written upon a narrow strip or stripe as, for instance, with run indicating devices of that type which are to register the periods of time during which the car has been running, the registering sheet or disk can be so designed as to serve not only for one day, but for a week. A recording disk of this kind is provided either with seven concentric stripes, or with a spirally shaped strip forming seven convolutions. A recording disk of the first-mentioned kind is illustrated in Fig. 4. The recording device is combined with a clock, as well as with a jolting device of the kind and for the purpose hereinbefore mentioned, this device operating automatically while the car is running and producing circularly curved lines of different lengths upon the disk, as shown in Fig. 4. No line is being drawn when the car is at rest.

If the foil consists of iron, and a magnet is used as effacing means, this magnet may be so designed and arranged as to serve also as a jolting member as shown, by way of example, in Figs. 5 and 6, in which $k$ denotes a shaft rotated by the clock work and making one revolution in 7 days, whereas the writing sheet or disk makes one revolution in 24 hours. The shaft $k$ carries a multiple cam $l$ having seven stepped cams (as in Fig. 5) if the recording disk has seven concentric strips, or seven non-stepped cams if it has seven windings forming a spiral.

In the example shown in Figs. 5 and 6, the cam $l$ supports a roller $m$ attached to a vertically movable slide $n$ guided in the frame $o$ of the indicating device. The effacing magnet $h$ is suspended on pivots $p$ carried by brackets projecting from the slide $n$. The writing pin $f$ is attached to one end of the magnet $h$ which is retained normally in a substantially vertical position by an inverted U-shaped spring $r$ secured to the slide $n$ and keeping the magnet in such a position that the writing pin does not contact with the recording disk so that no lines are produced thereon as long as the car is at rest. But when the car is running, the continual shocks cause the magnet to swing or oscillate upon the pivots $p$, and a line corresponding in length to the time consumed for the run is produced upon the recording disk. At the same time the pole-shoes $h'$ which are located in proper relation to the writing pin so as to be able to efface the lines resulting from a former record become operative.

In order to render this effacing procedure perfectly reliable, the recording sheet $c$ and the plate $a$ are enclosed together in a profiled ring $b$ (as in Fig. 2) so that said sheet cannot yield to the attraction of the magnet poles.

Further, in order to prevent the lines present upon the two adjacent strips from being effaced, the foil $d$ may be subdivided in the manner shown in Fig. 6. The individual rings $d'$ are located and guided in individual grooves $e'$ of the backing $e$. The magnet poles in this constructional form of the device are disposed in a recess of the backing and extend to the foil parts $d'$, as does the writing pin also. The ribs $e''$ of the backing retain the sheet $c$ so that it is prevented from following the foil rings $d'$ beyond the magnet poles.

The invention can be used in connection with many other devices, where a recording device for indicating or measuring purposes is required, as for instance with respect to the number of revolutions of machines and engines, the frequencies in electrical apparatus, or the heating of boilers.

Referring now to the modification shown in Fig. 7, the means by which the pointer $s$ is caused to assume a certain position indicating the speed of the car may be actuated in any desired manner, for instance by means of a flexible shaft, and that speed is, at the same time, recorded on a permanent recording sheet or disk of the kind already described with reference to the preceding figures. This sheet or disk is actuated by the shaft actuating the pointer and registers the speed of every run of the car, as well as the length of time. Of the motion-transmitting, or driving, means only those operating in connection with the previously described jolting mechanism are illustrated in Fig. 7. A worm $t$ meshes with the worm wheel $u'$ secured to a shaft $u$, to which is affixed also a worm $v$ meshing with a large worm-wheel $w$. Pivoted at $y$ to the casing or frame $x$ of the apparatus, is a bell-crank lever $z$ $z'$, the longer horizontal arm $z$ of which carries a poise $z''$ and is suspended from a helical spring 21, holding it normally in horizontal position, but permitting the bell-crank lever $z$ $z'$ to oscillate, or be jolted when the car is running.

The vertical arm $z'$ of the bell-crank lever is provided with an elastic pawl 22 engaging a ratchet wheel 22' connected with the worm $v$. A coupling 23 arranged between this worm and the shaft $u$ operates only in the driving direction of the way-measuring mechanism. The ratio of motion between the jolting lever $z$ $z'$, the pawl 22, and the ratchet wheel 22', is so chosen that the jolting mechanism operates slower than the way-measuring mechanism. If this latter fails from any cause, the jolting mechanism, which had not been able to act upon the way-measuring mechanism owing to the coupling 23 being thrown in, will at once replace said mechanism. As, in the case of the way measuring mechanism getting out of order, the pointer $s$ and the writing member will cease to operate, the jolting mechanism which now becomes active causes the gradual effacing of the record whereby the time when the way-measuring mechanism became inoperative can be ascertained.

As the jolting mechanism need operate only when the actuation of the speed indicator by the way-measuring device is interrupted, the oscillating jolting lever can be checked as long as the pointer $s$ is in proper working condition. There is provided for this purpose a checking arm 24 suspended from a pivot 24' and having a lateral lug 24'', as well as a downwardly extending lug 27', these lugs forming a recess 27 engaging a pin 28 projecting laterally from the lever arm $z$, the arrangement being such that this lever arm, or the jolting lever, is released only when the pointer $s$ is in one or the other of its end positions, but is checked at all intermediate positions. In order to cause this additional mechanism to operate in the manner mentioned, there is provided upon the shaft $s'$ a cog-wheel 25 which meshes with a cog-wheel 25' provided with lateral pins 26. 26', the position of which upon this wheel, and relatively to each other, corresponds to the two end positions of the pointer $s$, and which cooperate with the suitably shaped lug 24'' of the checking arm 24.

In the position of the parts in question as shown in Fig. 7 the lever $z$ $z'$ can swing as its pin 28 is not in contact with the lug 27' of the checking arm 24, the other lug (24") being engaged by the pin 26 whereby a tensile spring 29 affixed at one end to the arm 24 and at the other end to the casing is prevented from pulling the lug 27' against the pin 28. This position of the pin 26 corresponds to the zero positions of the pointer s. In the other end position the pin 26' engages the lever to hold the lug 27' out of engagement with the pin 28.

I claim:

1. In a recording device, comprising an automatically operating recording member, a permanent recording sheet adapted to allow of effacing the record, a way-measuring mechanism adapted to drive said recording sheet, an independent separate driving mechanism adapted to act as a substitute for the first mentioned mechanism, if said first mentioned mechanism should fail, and means to prevent operation of said separate driving mechanism when the first driving means is operating, substantially as set forth.

2. In a recording device, comprising an automatically operating recording member, a permanent recording sheet adapted to allow of effacing the record, a way-measuring mechanism adapted to drive said recording sheet, an independent separate driving mechanism adapted to act as a substitute for the first mentioned mechanism, if said first mentioned mechanism should fail, means to prevent operation of said separate driving mechanism when the first driving means is operating, and a common transmission shaft for said two mechanisms, substantially as set forth.

3. In a recording device, comprising an automatically operating recording member, a permanent recording sheet adapted to allow of effacing the record, a way-measuring mechanism adapted to drive said recording sheet, a jolting mechanism adapted to be actuated by the jerks of a running car and forming an independent separate driving mechanism adapted to act as a substitute for the first mentioned mechanism, if said first mentioned mechanism should fail, means to prevent operation of said separate driving mechanism when the first driving means is operating, substantially as set forth.

4. In a speed indicating and recording device, comprising a speed indicating means, an automatically operating recording member, a permanent recording sheet adapted to allow of effacing the record written upon it, a way-measuring mechanism adapted to drive both speed indicating means and recording sheet, a jolting mechanism adapted to be actuated by the jerks of a running car and forming an independent separate driving mechanism adapted to act as a substitute for the first mentioned mechanism, if said first mentioned mechanism should fail, and means for checking said jolting mechanism during that time in which the speed indicating hand is located between its end positions, substantially as set forth.

5. In a recording device, comprising an automatically operating recording member, a recording sheet with which said recording member produces a record, a way-measuring mechanism adapted to drive said recording sheet, a separate driving means for said recording sheet normally inoperative and means to bring said second driving means into operation with said recording sheet upon failure of said way-measuring mechanism as the driving means and means to prevent the second driving means operating during the operation of said way-measuring mechanism.

In testimony whereof I affix my signature.

FRIEDRICH WILHELM GUSTAV BRUHN.